United States Patent [19]
Kassai

[11] Patent Number: 4,582,362
[45] Date of Patent: Apr. 15, 1986

[54] SEAT-EQUIPPED NURSING IMPLEMENT
[75] Inventor: Kenzou Kassai, Osaka, Japan
[73] Assignee: Aprica Kassai Kabushiki Kaisha, Osaka, Japan
[21] Appl. No.: 444,581
[22] PCT Filed: Mar. 31, 1982
[86] PCT No.: PCT/JP82/00090
§ 371 Date: Nov. 17, 1982
§ 102(e) Date: Nov. 17, 1982
[87] PCT Pub. No.: WO82/03541
PCT Pub. Date: Oct. 28, 1982

[30] Foreign Application Priority Data
Apr. 22, 1981 [JP] Japan .................................. 56-61813
Jan. 12, 1982 [JP] Japan .................................. 57-3947

[51] Int. Cl.⁴ .......................... A47D 1/00; A47D 15/00
[52] U.S. Cl. .................................. 297/464; 297/459; 297/467
[58] Field of Search ................. 297/DIG. 4, 464, 467, 297/458, 459, 452

[56] References Cited
U.S. PATENT DOCUMENTS

| 1,716,871 | 6/1929 | Weldon | 297/459 |
| 1,902,367 | 3/1933 | Johnson | 297/467 |
| 2,156,629 | 5/1939 | Hutchison | 297/459 |
| 2,343,494 | 3/1944 | Burdick | 297/459 |
| 2,982,562 | 5/1961 | Gladstein | 297/DIG. 4 |
| 3,103,385 | 9/1963 | Grieco | 297/467 |
| 3,503,649 | 3/1970 | Johnson | 297/459 |
| 3,890,004 | 6/1975 | Rail | 297/458 |

FOREIGN PATENT DOCUMENTS

| 201804 | 1/1959 | Austria | 297/459 |
| 987221 | 4/1976 | Canada | 297/459 |
| 2316694 | 10/1974 | Fed. Rep. of Germany | 297/464 |
| 1380914 | 10/1964 | France | 297/459 |

Primary Examiner—William E. Lyddane
Assistant Examiner—Mark W. Binder
Attorney, Agent, or Firm—W. G. Fasse; D. H. Kane, Jr.

[57] ABSTRACT

A seat structure for use by a baby, for example in a carriage, equipped with a seat (1) having a seat portion (2) and a back rest portion (3), arranged for preventing a dislocation of a hip joint of a baby. The seat portion (2) has a surface configuration (8) which allows such a size (Wf) as to avoid the presence of obstacles which would inwardly urge the outer sides of the kneecaps of the baby seated with a crotch distance (W) which is maintained at a predetermined value for preventing the dislocation of a hip joint. The seat (1) has a pair of step portions (10) for the transverse positioning of the hips of the baby placed on the seat portion (2). Further, a projection (11) for positively keeping the crotch distance (W) of the baby is provided on the front portion of the seat portion (2), the projection (11) being positioned at the crotch of the sitting baby.

12 Claims, 14 Drawing Figures

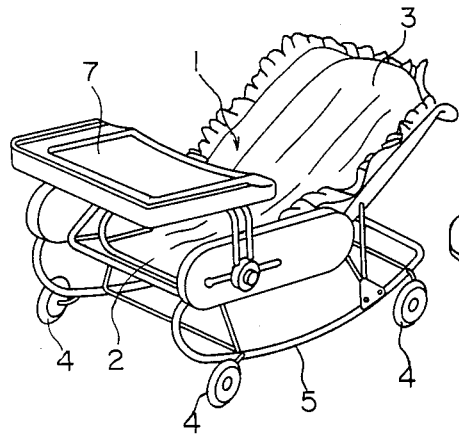
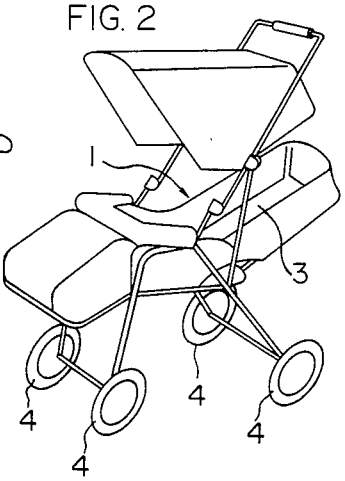
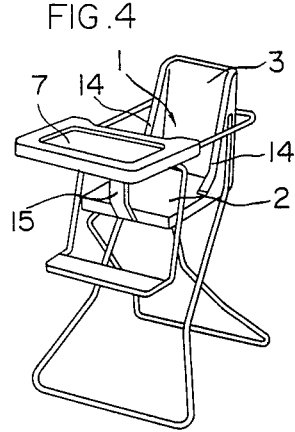
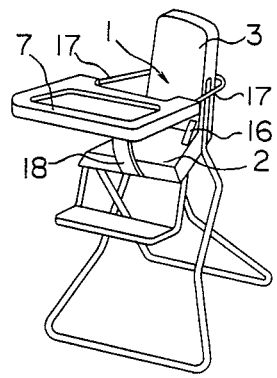
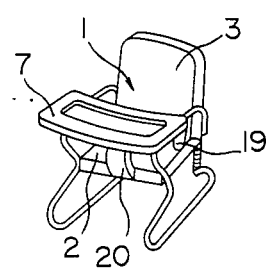
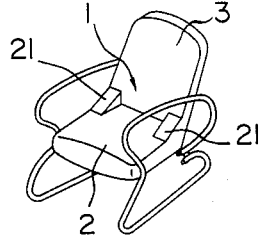

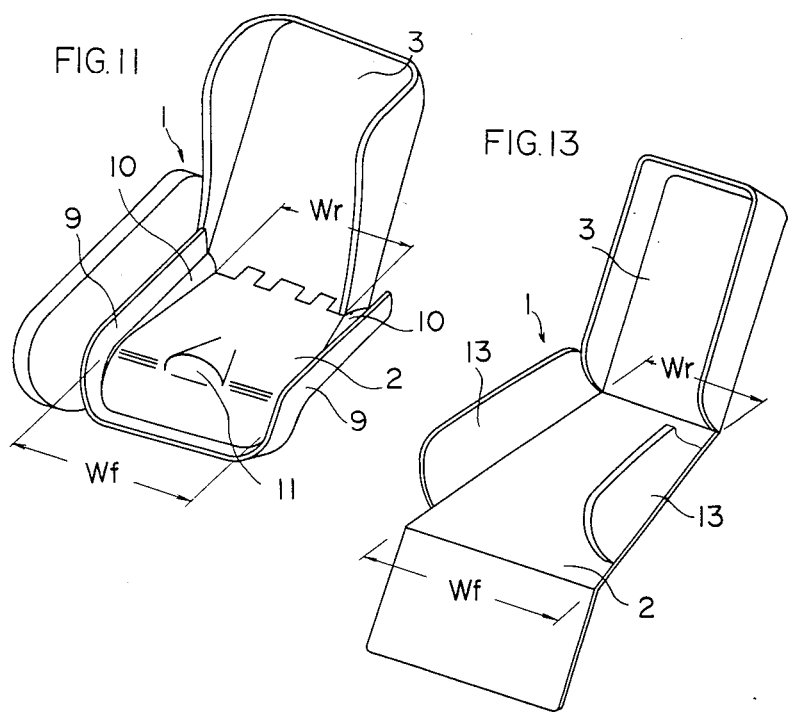
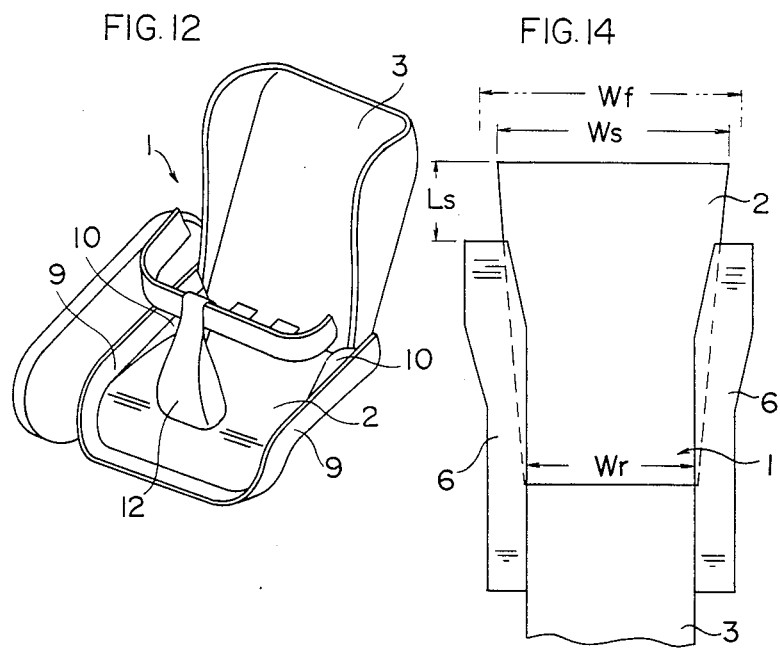

SEAT-EQUIPPED NURSING IMPLEMENT

TECHNICAL FIELD

The present invention relates to a seat structure for use by small children, especially for baby carriages. Such a seat structure may be part of a nursery chair or of a baby carriage. More particularly the invention relates to improvements intended to provide an environment which ensures a natural posture for the body of a baby without obstructing the free growth of babies.

BACKGROUND ART

Japan is one of the countries where congenital dislocation of the hip joint occurs frequently, as appears to be the case also with north American and Canadian Indians and north European Lapps and in Italy and West Germany. This disease is quite serious among congenital diseases of babies. As for the frequency of the disease, including incomplete dislocation, malformation of the acetabular tegmen and other mild forms of the disease, in addition to complete dislocation, it is estimated to be approximately 1 in every 20.

In the above-mentioned countries where congenital dislocation of the hip joint occurs frequently, there is a habit of stretching the baby's legs and wrapping up the same, and in Japan there was a period when the baby's legs were squeezed by a wrapping diaper or triangular diaper, thus keeping the hip joints stretched.

From such facts, it has been found that most of congenital dislocation of the hip joint is attributable to preventing free movement of the baby's legs and keeping them stretched in quite early stages of infancy. The incidence of congenital dislocation was sharply decreased by the use of a crotch diaper and a loose garment for babies immediately after they were born, which clothing does not interfere with the movement of the baby's legs and allows the legs to spread in natural form, i.e., the hip joints are permitted to bend and spread like those of a "frog".

The factors which prevent a natural cure of congenital dislocation of the hip joint and aggravate the disease are not limited to diapers and garments. The strap formerly used to carry a baby on the back has almost gone out of use with changes in life-style and the band for carrying a baby under the arm has come into frequent use. In the case of the band, the legs are stretched with the hips supported and the whole body is elongated and constrained, the baby often being forced to remain in such an unnatural position for a long time.

The modern baby carriage began to be used after the end of World War II, and baby carriages now in frequent use are not of the type in which a baby lies stretched but of the type in which a chair-type hammock is suspended. Further, such baby carriages have been reduced in size, with the hammock changed into one having a bag-like seat portion just as the strap changed into the band.

It is believed that in this manner, the changes in the environment for raising babies have resulted in abnormally pressing the hip joints of babies, leading to dislocation of the hip joint.

Dislocation of the hip joint is detected by a regular medical examination at health centers and the patients' parents are advised how to take care of their babies. In this case, the baby is treated so that it may be able to bend its legs and spread freely.

If the baby's hip joints are dislocated, the baby will limp as it learns to walk. However, where the symptoms of dislocation are slight or even if the affected part gets capsulated with insufficient medical care, there is no direct influence on life. As a result, there are many cases in which the affected part is left as it is. In such condition, if the baby grows, it will feel pain in the hip joints and limp, with the movement of the legs becoming worse, and finally the disease advances to uncurable, coxarthritis deformans.

Based on the way of thinking described above, the development of a nursing implement which adjusts the posture of a baby to its most natural body form and which does not interfere with its free movement is desired.

SUMMARY OF THE INVENTION

Accordingly, a principal object of the present invention is to provide a baby seat which satisfies the just stated requirements.

Another object of the present invention is to provide, more specifically, a baby carriage which satisfies said requirements.

In brief, the present invention is directed to a baby seat having a seat portion and a back rest portion, wherein said seat portion is so disposed in a space so dimensioned and shaped that it allows such a size as to avoid the presence of obstacles which would inwardly urge the outer sides of the kneecaps of a baby seated with crotch distance maintained at a predetermined value for the prevention of dislocation of the hip joint, and a pair of positioning members is provided for the transverse positioning of the hips of the baby placed on said seat portion. The just mentioned "crotch distance" is the spacing from kneecap to kneecap when the kees of a baby in the sitting position are spread apart.

In a preferred embodiment of the present invention, the seat portion is formed such that the lengths of its front end edge is greater than the lengths of its rear end edge, thereby to be substantially trapezoidal. Further, the lengths of the front end edge is selected such that it is at least about 36 cm.

Further, the pair of positioning members for the transverse positioning of the hips of the baby are realized by a difference in level in the rear of the seat portion at the upper surface of said seat portion. The difference in level is realized by a pair of step portions formed on opposite sides of the rear of the seat portion, or by a pair of lateral walls upwardly extending from the opposite sides of the seat portion.

Instead of the above described difference in level as formed on the rear of the seat portion, a pair of handrail members positioned above said seat portion to hold the opposite sides of the seated baby may be employed. The handrail members of the pair define the narrowest distance between their rear ends and the widest distance between the front ends. Further, preferably, these handrail members are each formed so that the front ends thereof terminate to leave a space above the front region of the seat portion, thereby to avoid the presence of obstacles which inwardly urge the outer sides of the kneecaps of a baby.

Other objects and features of the present invention will become more apparent from the following description to be given with reference to the drawings.

DESCRIPTION OF THE DRAWINGS

FIG. 1 is a perspective view showing an example of a combination chair and bed to which the present invention is directed;

FIG. 2 is a perspective view showing an example of a baby carriage to which the present invention is directed;

FIG. 4 is a perspective view showing an example of a high chair type combination table and chair to which the present invention is directed;

FIG. 5 is a perspective view showing another example of a highchair type combination table and chair;

FIG. 6 is a perspective view showing a room chair to which the present invention is directed;

FIG. 7 is a perspective view showing another example of a room chair;

FIG. 11 is a perspective view showing the principal portion of a seat and backrest embodiment of the present invention;

FIG. 12 is a perspective view showing the principal portion of another seat and backrest embodiment of the present invention;

FIG. 13 is a perspective view of the principal portion of a further seat and backrest embodiment of the present invention; and FIG. 14 is a plan view showing the principal dimensions of another embodiment of the present invention.

Figure 3:
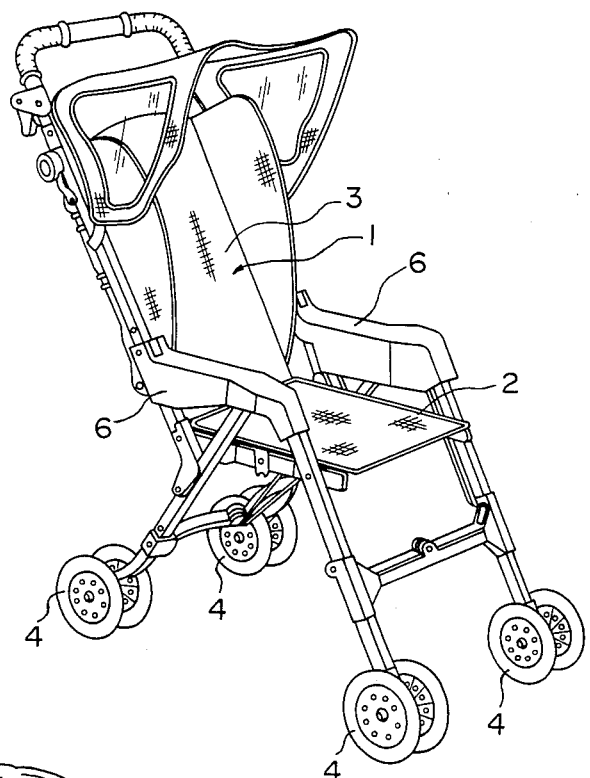
FIG. 3 is a perspective view showing another example of a baby carriage.

DETAILED DESCRIPTION OF PREFERRED EXAMPLE EMBODIMENTS AND OF THE BEST MODE FOR CARRYING OUT THE INVENTION

FIG. 1 shows a combination chair and bed on wheels usable from several days after birth. The combination is provided with a seat 1 having a seat portion 2 and a backrest portion 3. The backrest portion 3 is tiltable and is selectively usable as a chair or a bed. In the lower region, wheels 4 are provided, whereby the combination can be easily moved to any desired place. The wheels 4 are adapted to be turned upward to allow a curved lower frame 5 to come in contact with the floor, thus enabling the combination to be used as a cradle.

FIG. 2 shows a baby carriage usable for babies about two months after birth. As in the case of the combination chair and bed shown in FIG. 1, it is provided with a seat 1. The seat 1 comprises a seat portion, not seen in FIG. 2 as it is hidden, and a backrest portion 3. This backrest portion 3 is also tiltable to provide a chair form or a bed form. In the lower region, the carriage is provided with wheels 4.

FIG. 3 also shows a baby carriage provided with a seat 1 having a seat portion 2 and a backrest portion 3. The backrest portion 3 is also tiltable to provide a chair form or a bed form. In connection with the seat 1, a pair of handrail members 6 are provided. In the lower region, wheels 4 are provided.

FIG. 4 shows a highchair type combination table and chair usable for babies 5–6 months after birth when babies are able to sit. The highchair has a seat 1 comprising a seat portion 2 and a backrest portion 3.

FIG. 5 also shows a highchair type combination table and chair having a seat comprising a seat portion 2 and a backrest portion 3.

FIG. 6 shows a low chair for use in a room, which is usable for babies 5–6 months after birth when babies are able to sit. This low chair is also provided with a seat 1 comprising a seat portion 2 and a backrest portion 3.

FIG. 7 also shows a low chair for use in a room, provided with a seat 1 comprising a seat portion 2 and a backrest portion 3. While the combination chair and bed shown in FIG. 1, the chair type combination table and bed units shown in FIGS. 4 and 5, and the room chair shown in FIG. 6 have been provided with a table 7, the room chair shown in FIG. 7 is not provided with such table. Similarly, some of the combination chair and bed units and chair type combination table and chair units are not provided with a table and some have their tables adapted to be removable.

Besides, the combinations described above, of the type equipped with a seat on which a baby sits, may include baby chairs adapted to be attached to the seat of an automobile.

Clinical data which form the direct cause of the proposal of the present invention will now be discussed.

Figure 8:
FIG. 8 illustrates the basic natural body form of a baby.

FIG. 8 illustrates the basic natural body form of a baby, showing the so-called crotch distance W from kneecap to kneecap when the baby's legs are spread as shown.

Figure 9:
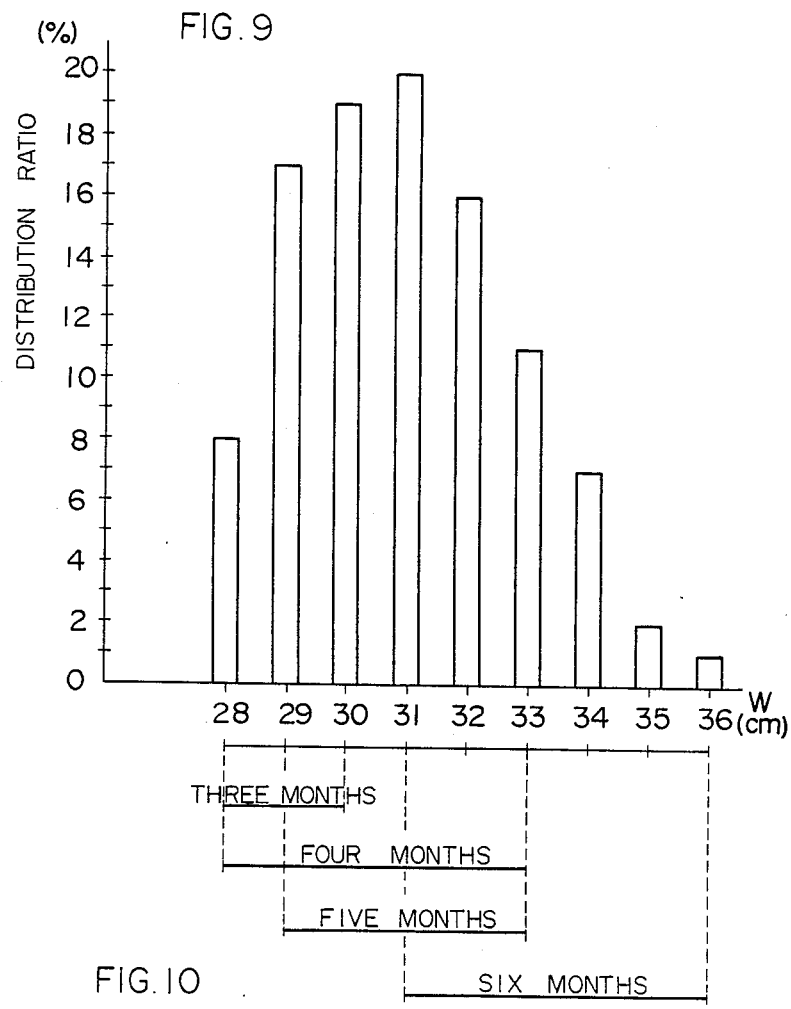
FIG. 9 is a graph showing a distribution of the crotch distance for the natural body form of a baby at an age of three to six months.

FIG. 9 is a graph showing a desired distribution of crotch distances for the natural body form of babies in the age group of three to six months. As shown in FIG. 8, the legs of a baby in natural body form assume a posture in which the hip joints are bent and spread as those of a "frog". The condition for providing an environment which positively ensures such natural body form, i.e., the healthiest and most comfortable posture so as not to prevent free growth is to keep at a predetermined value the distance between the kneecaps with the crotch spread, i.e., the crotch distance W for maintaining the natural posture.

The desirable data shown in FIG. 9 can hardly be found, not only in Japan, but also in foreign countries; it is the result of examinations conducted for the past two years by the present inventor in cooperating with national hospitals and health centers. The period for positively maintaining the natural body form as described above is 6 months after birth, said period being the most important period. The data shown in FIG. 9 are the results of measurements on 3- to 6-month-old newborn babies. The bar graph shown in FIG. 9 indicates a percentage distribution of the crotch distance W. For example, it shows that babies having a crotch distance W of 31 cm are 20% of all new births. Line segments drawn under numbers indicating the crotch distance W each show a distribution of the crotch distance W corresponding to the number of months after birth (age). Thus, it is seen that the crotch distance W is distributed such that it is 28–30 cm at 3 months after birth, 28–33 cm at 4 months, 29–33 cm at 5 months, and 31–36 cm at 6 months. In addition, it has been found that there is no appreciable change in the crotch distance W during a period from the 6th to the 10th month when babies begin to be able to make walking efforts.

From the above clinical data, it is seen that it is sufficient for the seat to allow 36 cm which is the maximum value for the crotch distance W. It is to be noted, however, that the average crotch distance W at 6 months after birth is 33 cm. In addition, the seat, particularly the seating portion, may not be needed to have said dimension of 36 cm; it is to be pointed out that even if the crotch distance is 36 cm, it is only necessary that there be no obstacles at the place opposed to the kneecaps, and it is not absolutely necessary that the width of the seat portion be 36 cm.

Figure 10:
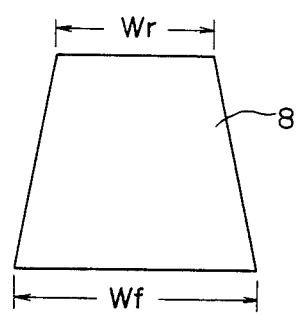
FIG. 10 is a plan view showing the size of a base surface for a space provided above a preferable seat configuration according to the present invention.

FIG. 10 is a plan view showing the size of a base surface 8 of a space provided above the seat portion in this sense. It may be said that it is sufficient for the base surface 8 to be at least trapezoidal. The width Wf of the front end of the surface 8 is associated with the crotch distance W of a sitting baby with said distance kept at a predetermined value for preventing a dislocation of the hip joint, it being sufficient for said surface 8 to have such a size as to present no obstacles which would laterally inwardly urge the kneecaps of a baby. From the clinical data described above, it may be said that a sufficient width Wf of the front end of the surface 8 is about 36 cm. As for the width Wr of the rear end of the surface 8, it is only necessary for said distance Wr to have a dimension so determined as to effect the transverse positioning of the baby's hips placed on the seating portion.

Each of the seats 1 of the chairs or baby carriages shown in FIGS. 1 to 7 will directly influence the posture of the baby. Therefore, it will be understood that there is a need to give such seat 1 those features which will positively ensure a natural body form so as not to interfere with the baby's free growth. Embodiments of the invention will now be described, particularly in connection with the seat 1, with reference to the drawings.

FIG. 11 is a perspective view showing the principal portion of an embodiment of the invention. The seat 1 shown in FIG. 11 may, as viewed externally, be understood to represent the seat 1 of the combination chair and bed unit of FIG. 1. The opposite lateral edges of the seat portion 2 of the seat 1 are provided with upright wall portions 9. Therefore, the width Wf of the front end of the surface 8 shown in FIG. 10 is represented as the distance between the front ends of the wall portions. A pair of step portions 10 are provided on the opposite sides of the rear of the seat portion 2, and the distance defined between said step portions 10 corresponds to the width Wr of the rear end of the space 8 of FIG. 10. Thus, the pair of step portions 10 define a difference in level with the upper surface of the seat portion 2 as a reference, to thereby hold the baby's buttocks and hence the hips therebetween to effect the positioning of the baby's hips.

A relatively forward region of the seat portion 2 shown in FIG. 11 is formed with a projection 11 made of soft material. The projection 11 is positioned at the crotch of the sitting baby to thereby positively keep the crotch distance W (FIG. 8) of the baby, at said predetermined value or greater for prevention of dislocation of the hip joint, the combined use of such correcting means producing a more preferable result.

FIG. 12 is a perspective view showing the principal portion of another embodiment of the invention. The embodiment shown in FIG. 12 is substantially the same as that shown in FIG. 11 except that the projection 11 is replaced by a crotch belt 12. The crotch belt 12 performs the same function as that of the projection 11, intended to positively keep the baby's crotch distance W at a predetermined value or greater. To this end, the crotch belt 12 is wider particularly in its lower portion.

In the two embodiments described above, the projection 11 and the crotch belt 12 have been used as additional correction means for positively keeping the baby's crotch distance W. The maximum value for the width of these correction means is determined in connection with the baby's crotch distance W, but it does not always conform to the distance between the portions of the knees having the crotch distance W. For example, the crotch belt 12 is, generally, positioned at a place closer to the baby's crotch, said place not being in the region just inside the knees having the crotch distance W, it being positioned in a region narrower than the maximum width region. Therefore, the widthwise dimensions of the projection 11 and crotch belt 12 as correction means should be suitably determined depending upon the place where such correction means is located. The embodiments shown in FIGS. 11 and 12 have footrests 2' closely spaced from the surface of the seat portion 2 so as to facilitate the baby's leg position shown in FIG. 8.

FIG. 13 is a perspective view of the principal portion of a further embodiment of the present invention. The seat 1 shown therein may be understood to represent the seat 1 of the baby carriage shown in FIG. 2. The seat portion 2 of the seat 1 shown therein is trapezoidal and is provided along its opposite lateral edges with a pair of lateral walls 13 which are upright. Therefore, the width Wf of the front end and the width Wr of the rear end of the space shown in FIG. 10 are both determined by the distance between the lateral walls 13. That is, the predetermined dimension for prevention of dislocation of the hip joint is realized between the front ends of the lateral walls 13, while the specified dimension for effecting the transverse positioning of the baby's hips is realized between the rear ends of said walls.

FIG. 14 is a plan view of the principal portion of another embodiment of the present invention. The seat 1 of FIG. 14 may be understood to represent the seat of the baby carriage of FIG. 3. The seat portion 2 of the seat 1 shown therein is also formed trapezoidal. However, in this embodiment, such shape of the seat portion 2 is not so significant. More particularly, in this embodiment, as shown in FIG. 3, a pair of handrail members 6 are provided above the seat portion 2, said members forming an important factor for determining the space 8 of FIG. 10. In this embodiment, the length Ws of the front edge of the seat portion 2 does not specify the width Wf of the front end of the surface 8 of FIG. 10. This is so, because each handrail member 6 is constructed so that its front end terminates to leave a space having a length Ls above the front region of the seat portion 2. Therefore, even if the length Ws of the front edge of the seat portion 2 is actually smaller than the width Wf of the front end of the space 8 of FIG. 10, it is possible to give the same dimension as the width Wf of the front end in FIG. 10 to the kneecaps of the baby sitting on the seat portion 2. Further, the pair of handrail members 6 is positioned to hold the sides of the sitting baby therebetween. A characteristic arrangement of the handrail members 6 is that the rear ends define a distance narrower than that defined by the front ends. This has the effect of making the width Wf of said front end sufficient while ensuring the positive transverse positioning of the baby's hips.

The present invention is also applied to the chairs shown in FIGS. 4 to 7.

In FIG. 4, in the rear of the seat portion 2, a pair of step portions 14 extend from the backrest portion 3 to hold the baby's hips therebetween, The width of the front end of the seat portion 2 is determined on the basis of the width Wf of the front end of the space 8 of FIG. 10. Further, the crotch belt 15 of FIG. 4 performs the same function as that of the crotch belt 12 of FIG. 12.

The seat portion 2 of FIG. 5 is formed trapezoidal. The opposite sides of the rear of the seat portion 2 is formed with a pair of step portions 16 (only one of wich is visible), designed to perform the function of holding the baby's hips therebetween for positioning. Further, a pair of handrail members 17 extending from the backrest 3 to the table 7 are narrowed particularly at their rear ends for performing the same function as that of the handrail members 6 of FIG. 14. The crotch belt 18 of FIG. 5 also performs the same function as that of the crotch belt 12 of FIG. 12.

A pair of step portions 19, only one of which is visible in FIG. 6, is formed on the opposite sides of the seat portion 2 shown in FIG. 6, for the positioning of the baby's hips. The dimension of the front end of the seat portion 2 is also determined in the basis of the width Wf of the front end in FIG. 10. The crotch belt 20 of FIG. 6 also performs the same function as that of the crotch belt 12 of FIG. 12.

A pair of step portions 21 is formed on the opposite sides of the rear region of the seat portion 2 of FIG. 7, for positioning the baby's hips. The dimension of the front end of the seat portion shown therein is also determined on the basis of the width Wf of the front end in FIG. 10.

The present invention has been described in connection with various embodiments thereof. As considered merely from the purpose of prevention of dislocation of the hip joint, it may be said that the larger the width Wf of the front end of the space 8 of FIG. 10, the better. However, in seat-equipped structures with which the present invention is concerned, it cannot be said that simply increasing the width Wf provides satisfactory results. This is because simply increasing the width not only fails to give a stabilized environment to the baby but also results in an excessive size which, in light of the purpose for which these structures are used, is inconvenient.

Therefore, in the present invention, the essential condition is the absence of obstacles outside the kneecaps which would inwardly urge the kneecaps, in addition to the stabilized positioning of the baby's hips. According to the present invention, which satisfies such condition, it is possible to keep the baby's crotch distance at a predetermined value for the prevention of dislocation of the hip joint and to provide a stabilized environment to the baby.

In addition, in this invention, while the widthwise dimension of the seat portion of the seat is an important factor, if there exists a seat widthwise dimension of which is adjustable, then it may be said that it is only necessary that the width Wf of the front end in FIG. 10 described previously be brought about in the maximum width in this adjustable range.

What is claimed is:

1. In a baby carriage with a seat structure for use by a baby in which the baby is encouraged to hold its legs in a natural way with its knees pulled toward its body so that the knees are substantially spread apart to define a crotch distance (W) from kneecap to kneecap, the improvement comprising a seating member providing a seating surface for a baby, said seating surface having a front edge and a rear edge, said front edge having a length ($W_f$) of at least about 36 cm corresponding substantially to said crotch distance (W), said rear edge having a length (Wr) smaller than said length ($W_f$) to form said seating surface as a wedge shaped seat, first means comprising two lateral hip positioning members located near said rear edge and spaced from each other by said length (Wr) for substantially locating a baby's hips against lateral displacement in directions extending substantially in parallel to said front and rear edges, second means providing an obstacle free space laterally next to said front edge of said seating surface and next to said kneecaps, said obstacle free space having a length in the direction of said front edge corresponding at least to said crotch distance for permitting a baby to hold its legs including the knees in said natural way, and a downwardly widening crotch member positioned between the thighs of a baby seated on said wedge shaped seat for assisting a baby in holding the kneeds in said natural way, wherey said hip positioning members, said obstacle free space, and said downwardly widening crotch member cooperate in preventing a hip joint dislocation.

2. The baby carriage of claim 1, wherein said front edge including said free space has a length corresponding to at least about 36 cm.

3. The baby carriage of claim 1, wherein said two lateral hip positioning members of said first means comprise two lateral wall portions extending upwardly along opposite lateral sides of said seating surface, said two lateral wall portions having rear ends spaced from each other by said distance (Wr) smaller than said crotch distance (W) and front ends spaced from each other approximately by said crotch distance (W).

4. The baby carriage of claim 1, wherein said seating surface has a front portion along said front edge and a rear portion along said rear edge, said rear portion being located at a lower level than said front portion for forming said two lateral hip positioning members.

5. The baby carriage of claim 4, wherein said two lateral hip positioning members comprise two step portions formed on opposite sides of said seating surface near said rear edge of said seating surface.

6. The baby carriage of claim 4, wherein said two lateral hip positioning members comprise two lateral wall members extending upwardly from opposite sides of said seating surface.

7. The baby carriage of claim 1, wherein said two lateral hip positioning members comprise two handrail members positioned above said seating surface for said firmly locating a baby's hips.

8. The baby carriage of claim 7, wherein said handrail members have rear ends spaced by said distance (Wr) smaller than said crotch distance (W), and front ends spaced by a length between said distance (Wr) and said crotch distance (W).

9. The baby carriage of claim 8, wherein said handrail members are shorter than a spacing between said front and rear edge of said seating surface for providing said free space.

10. The baby carriage of claim 1, wherein said correcting member comprises an upwardly extending projection formed centrally on said seating surface, said projection having its largest dimension near said front edge and tapering toward said rear edge.

11. The baby carriage of claim 1, further comprising a footrest connected to said front edge and closely spaced from said front edge to facilitate the baby's leg position with the knees spread apart.

12. In a baby carriage with a seat structure for use by a baby in which the baby is encouraged to hold its legs in a natural way with its knees pulled toward its body so that the knees are substantially spread apart to define a crotch distance (W) from kneecap to kneecap, the improvement comprising a seating member providing a seating surface for a baby, said seating surface having a front edge and a rear edge, said front edge having a length (Wf) corresponding substantially to said crotch distance (W) of at least about 36 cm, said rear edge having a length (Wr) smaller than said length (Wf) to form said seating surface as a wedge shaped seat, first means comprising two lateral hip positioning members located near said rear edge and spaced from each other by said distance (Wr) for substantially locating a baby's hips against lateral displacement in directions extending substantially in parallel to said front and rear edges, second means providing an obstacle free space laterally next to said front edge of said seating surface and next to said kneecaps, said obstacle free space having a length in the direction of said front edge corresponding at least to said crotch distance for permitting a baby to hold its legs including the knees in said natural way, third means including a footrest connected to said front edge and spaced sufficiently close to said front edge for lifting a baby's legs into said natural way with the knees pulled apart, and fourth means in the form of a downwardly widening crotch member positioned between the thighs of a baby seated on said wedge shaped seat for assisting a baby in holding the knees in said natural way, whereby said hip positioning members, said free space, said footrest, and said downwardly widening crotch member cooperate in preventing a hip joint dislocation.

* * * * *